Figure 1:
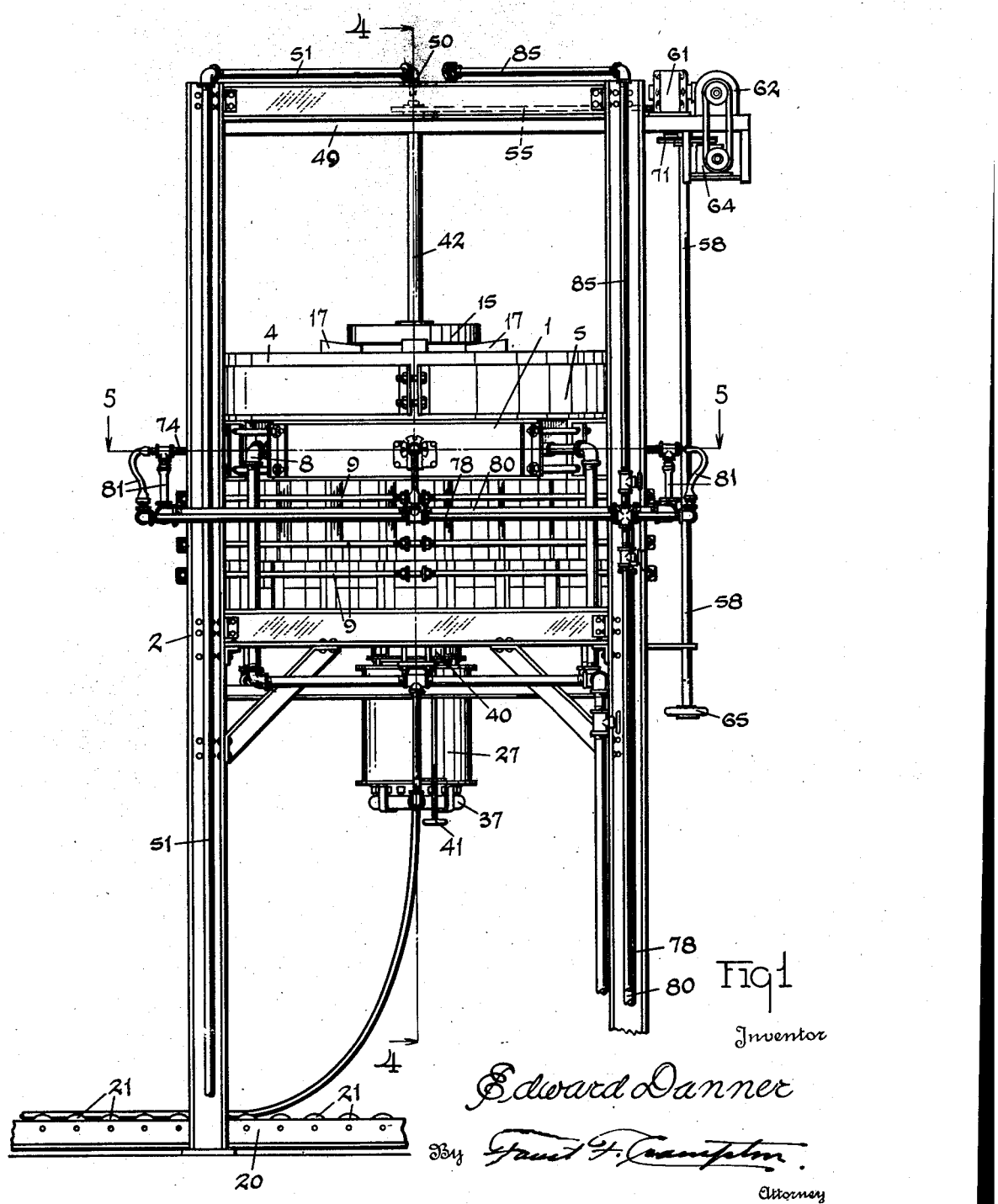

March 6, 1945. E. DANNER 2,370,618

GLASSWARE-FORMING APPARATUS

Filed June 10, 1940 5 Sheets-Sheet 2

Inventor
Edward Danner
By [signature]
Attorney

March 6, 1945.  E. DANNER  2,370,618
GLASSWARE-FORMING APPARATUS
Filed June 10, 1940  5 Sheets-Sheet 4

Inventor
Edward Danner
By *[signature]*
Attorney

March 6, 1945.  E. DANNER  2,370,618
GLASSWARE-FORMING APPARATUS
Filed June 10, 1940   5 Sheets-Sheet 5

Inventor
Edward Danner
By Faust F. Crampton.
Attorney

Patented Mar. 6, 1945

2,370,618

UNITED STATES PATENT OFFICE 2,370,618

GLASSWARE-FORMING APPARATUS

Edward Danner, Newark, Ohio

Application June 10, 1940, Serial No. 339,605

5 Claims. (Cl. 49—17.1)

My invention has for its object to provide an efficient day tank; that is, a tank, that, ordinarily, in commercial use, may be charged with glass batch materials at the end of one day, the batch materials melted during the following night to form glass, and the glass drawn and the ware formed during the succeeding day.

The invention, particularly, provides a tank for containing heated glass and having a central outlet in the bottom of the tank and a glass shaping element located beneath the bottom of the tank and the outlet to receive the glass that flows from the tank. The central outlet in the bottom of the tank will cause the glass to move continuously and radially from all parts of the molten glass in the tank toward the upper end of the outlet and from the outlet to the upper end of the glassware-shaping element.

The glassware-shaping element shapes the molten glass stream from the outlet into ware form. Also, the shaping element is provided with means for controlling the flow of the glass from the outlet to maintain substantially constant flow of glass, notwithstanding the reduction of the head or static pressure as the level of the glass lowers in the tank, and, a means for manually controlling the rate of flow of the glass from the tank; and a means for varying the wall thickness of the tubular glass that may be produced by the apparatus. Also, suitable means for discontinuing the flow of the molten glass from the tank may be provided for retaining the unused molten glass in the tank for subsequent use with glass formed from a new batch.

The upper end of the shaping element, being located beneath the lower edge of the outlet, means may be provided for shifting the element to maintain a substantially constant flow of the glass over the shaping element as the level of the glass is lowered in the tank and adjusted with respect to the opening in the tank, to maintain a desired quantity flow over the shaping element according to the viscosity of the glass and the temperature conditions to which it may be subjected. Also, a means is provided for freezing the glass stream at a point that will block the flow until sufficient additional molten glass has been formed to produce a day's operation of the apparatus.

When the surface of the glass approaches and before the surface of the glass reaches the bottom of the tank, the central outlet of the tank may be closed, and the dross is trapped within the tank. The ware forming operation may be discontinued and the dross discharged or used for other purposes. The ware is thus formed of glass having an exceedingly high quality.

The invention may be contained in structures of different forms and, to illustrate a practical application of the invention, I have selected a day tank embodying the invention as an example of the various structures in which the invention may be utilized.

Figure 2:
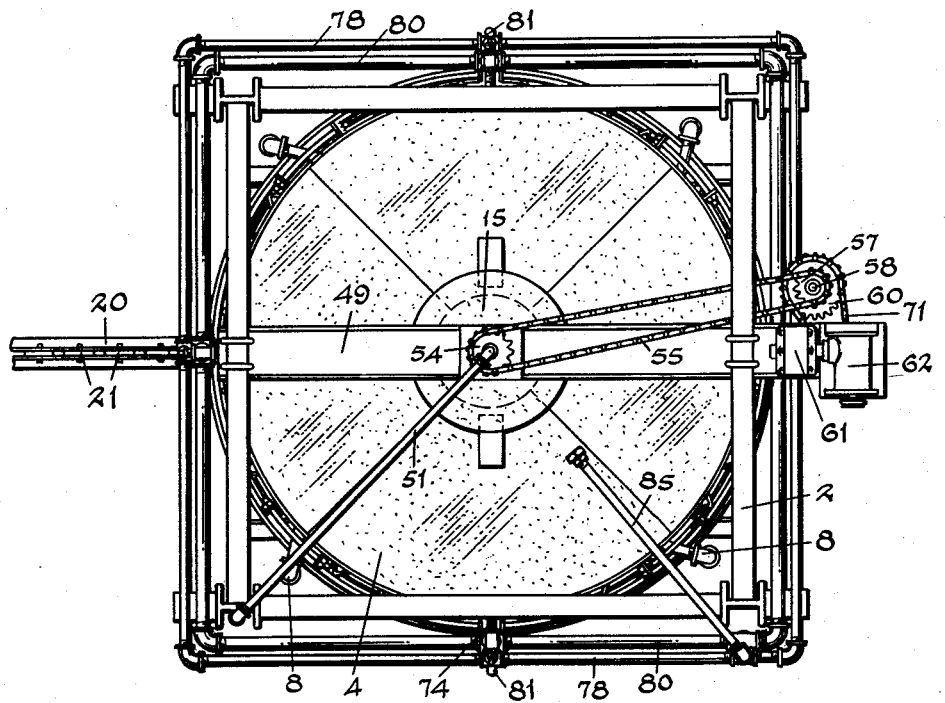
Figure 3:
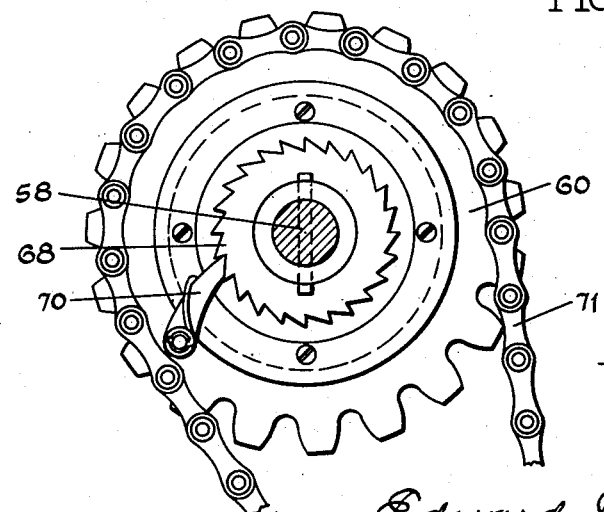
Figure 4:
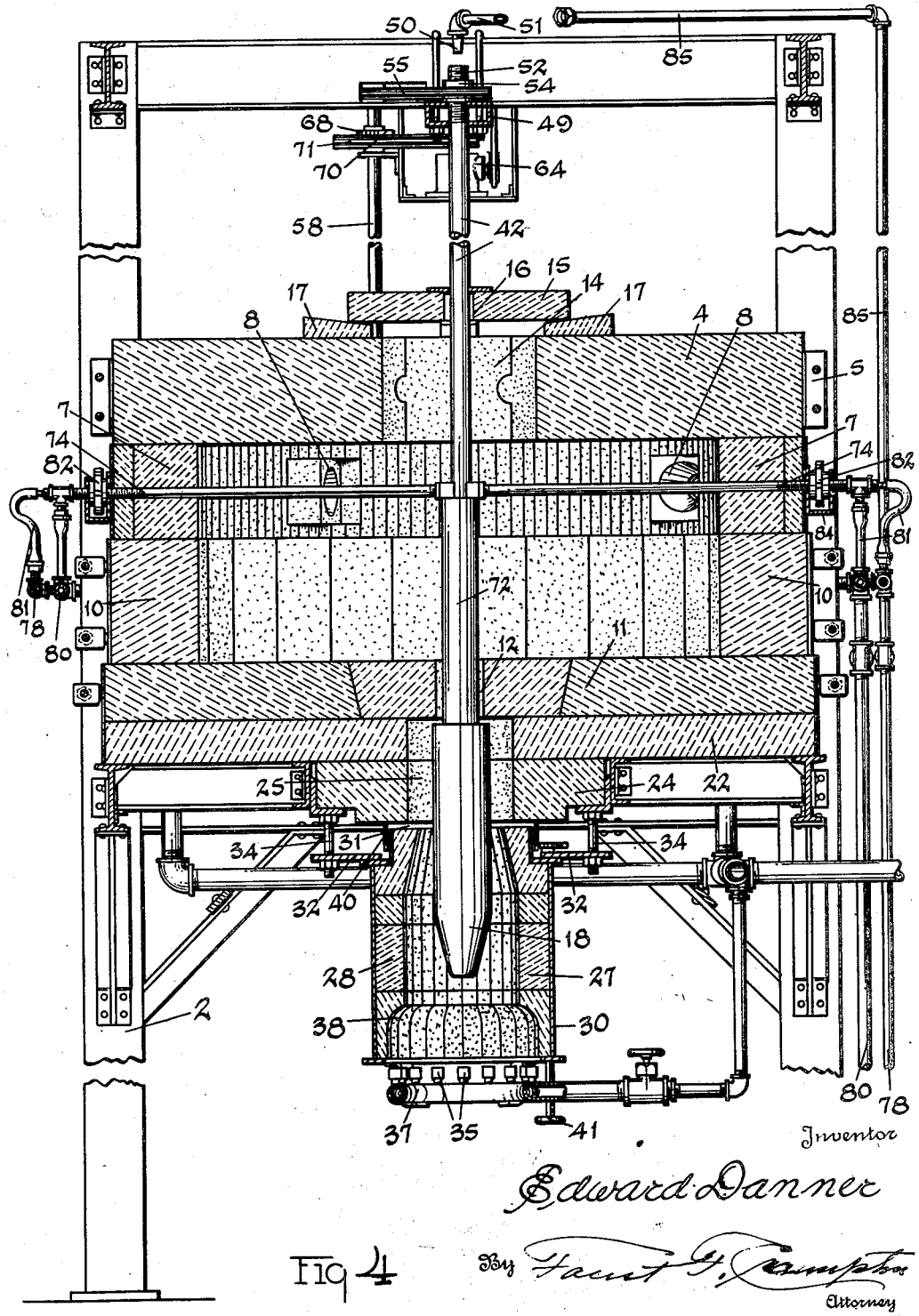
Figure 5:
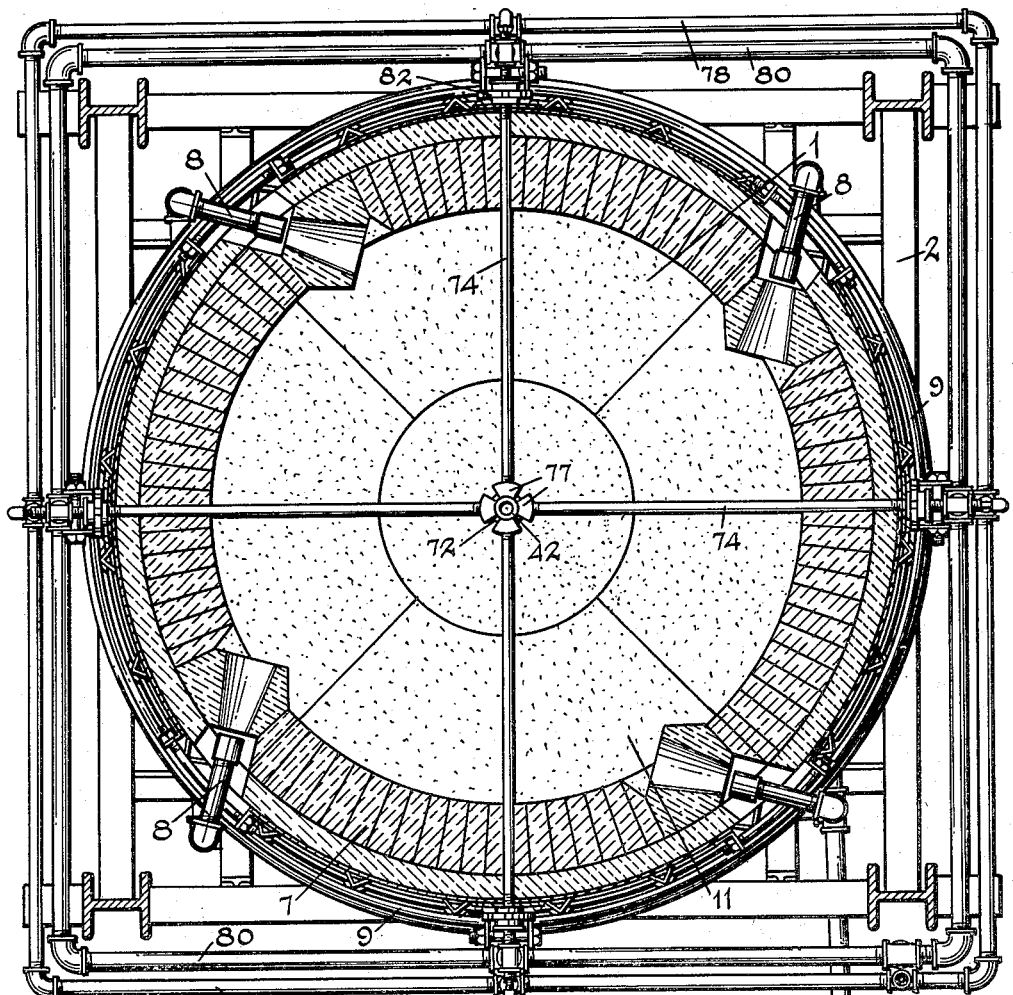
Figure 6:
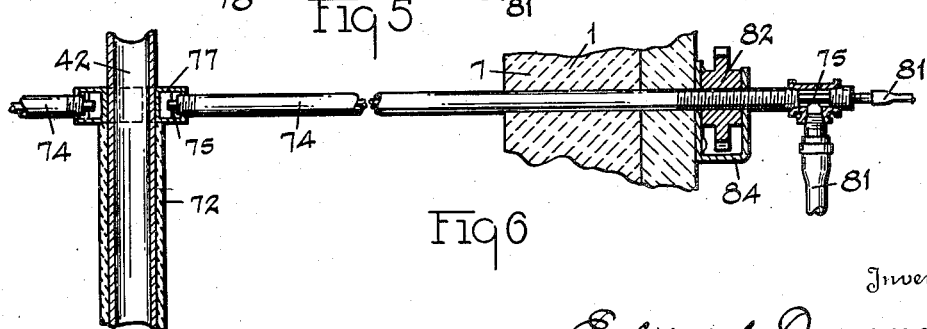
Figures 7, 8:
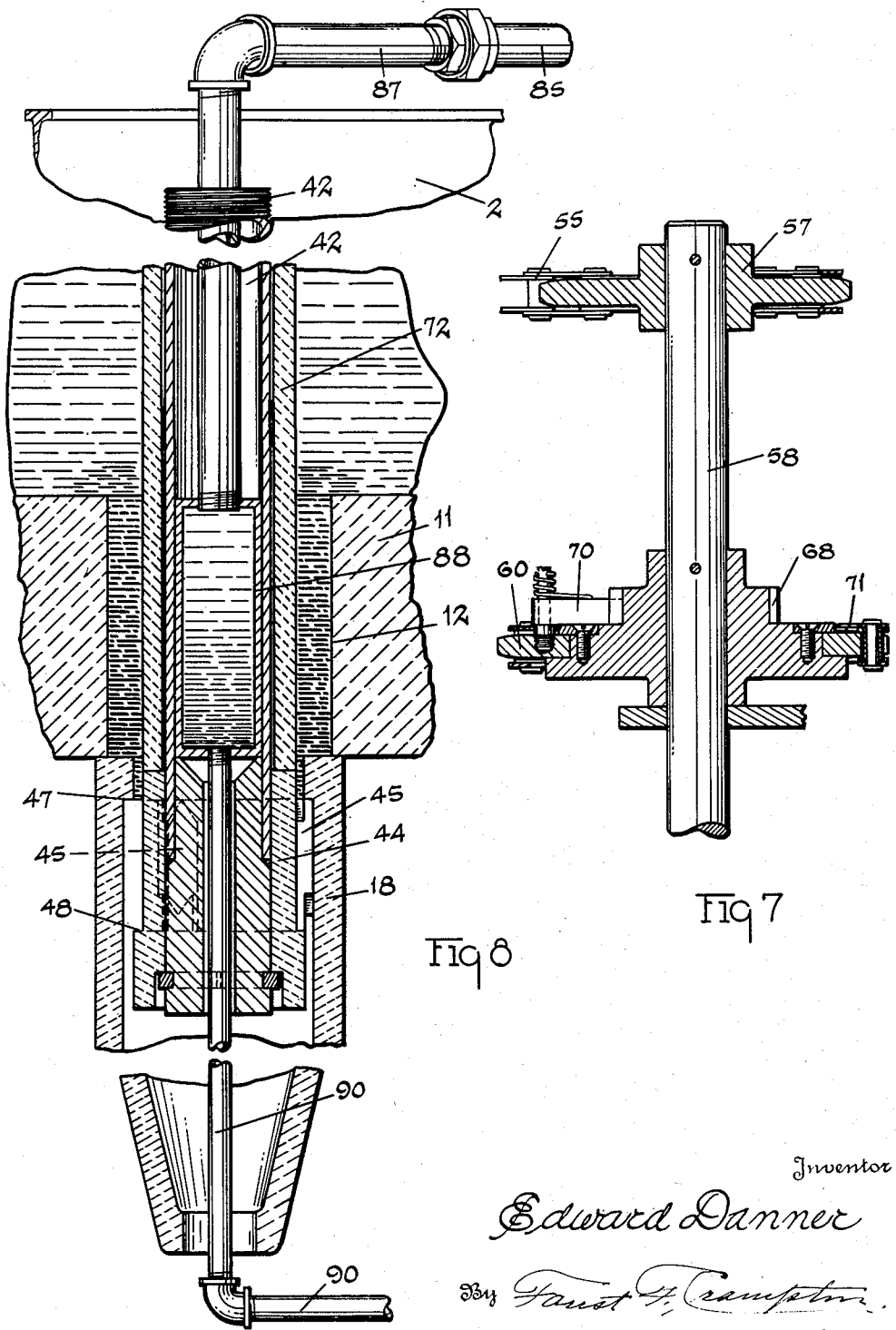

Fig. 1 illustrates a side view of the day tank. Fig. 2 is a top view of the tank. Fig. 3 illustrates a section of a part of an adjustable feeding device for regulating the flow of the glass from the tank. Fig. 4 is a view of a vertical section of the tank, taken on the plane of the line 4—4, indicated in Fig. 1. Fig. 5 is a view of a horizontal section of the tank, taken on the plane of the line 5—5, indicated in Fig. 1. Fig. 6 is a broken view of a means for adjusting the suspended ware-shaping element, with reference to the tank and its opening. Fig. 7 illustrates a view of a section of the glass-feeding regulator. Fig. 8 is a broken view showing a section of the central part of the tank and means for sealing the tank, when the glass is first formed from the batch materials, to prevent flow of the glass until the batch has been completely melted.

The tank 1 is formed of the usual refractory clay blocks and is mounted, for support, in the frame 2, to which the parts of the apparatus are secured. The tank 1 is, preferably, cylindrical in form and is provided with a top wall 4 (Fig. 4) formed of sector blocks that may be bonded together, by means of the metal band 5. The tank body is provided with a plurality of narrow, substantially segmentally-shaped blocks 7, in which the burners 8, for heating the tank, are located, and, also, larger segmental blocks 10, that form the main side walls of the tank, in which the batch materials are located and melted. The blocks 7 may be surrounded by curved refractory blocks and the blocks 7 and 10 may be suitably bonded by the rods 9. The burners 8 are formed to project flames, circularly, over the inner surface of the tank and to produce a continuous whirling flame within the top of the tank and over the surface glass as it is formed from the batch materials. The bottom 11 of the tank 1 may, also, be formed of sector blocks. The bottom of the tank has a central opening 12, through which the glass, when melted, may flow. The central part of the top or ceiling 4 of the tank is provided with a large opening 14 for introducing batch materials into the tank and for centrally removing the exhaust gases of the flame and produce a uniform, high temperature throughout the tank. The opening 14 may be covered, during the melting and heating operation, by means of a block 15 that is slightly raised from the top, by means of small wedge blocks 17, that may be moved radially, with reference to the opening 14, to raise or lower the block 15 to regulate the escape of the exhaust gases of the burners 8. The block 15 has a central opening 16.

A glass-shaping element such as a cylindrical mandrel 18, formed of refractory material, is centrally disposed below the opening 12 to direct the molten glass onto the upper end of the mandrel and cause it to be uniformly distributed over the surface of the mandrel to form the glassware. The glass flows downward over the surface of the mandrel and gradually cools until it is formed into shape. As the ware is formed, it descends from the lower end of the mandrel. The ware may be fed to a bed 20 having rollers 21 for directing the formed glass from the furnace and allowing it to further cool. The ware formed by the shaping element is glass tubing, and, for that purpose, the element is, preferably, formed hollow to direct portions of the glass, both exteriorly and interiorly over the shaping element, that are united at the lower end of the shaping element to produce smooth exterior and interior surfaces on the glass tube thus formed.

The tank 1 is located on a layer of bonded, segmental blocks 22, and a block 24 is located below the blocks 22. The blocks 22 and 24 are supported by the frame 2. A relatively large, central opening 25, coaxial with the opening 12, is formed in the blocks 22 and 24, while the opening 12, in the bottom 11 of the day tank 1, is smaller than the opening 25. The upper end of the mandrel is preferably larger than the size of the opening 12 and is freely movable in the opening 25, and means is provided for raising and lowering the mandrel for regulating the flow of the glass from the tank and to close the opening 12. Dependent upon the relative location of the upper end of the mandrel 18 with reference to the opening 12, the glass flows from the tank and passes over the surface of the mandrel and freely moves within the opening 25.

In order to maintain, particularly, the upper end portion of the mandrel at a desired temperature to maintain the proper fluidity and produce the proper viscosity of the glass, the lower end of the mandrel, below the wall formed by the blocks 22 and 24, is surrounded by a refractory shell 27 and the interior of the shell is heated by a plurality of burners. The shell 27 is formed of refractory blocks 28, preferably, circular in form and bonded by a sheet metal retaining wall 30.

The upper end of the shell 27 is slightly spaced from the lower surface of the blocks 24 to form an annular opening 31. The shell 27 is provided with a pair of metal projections or wings 32, and a pair of studs 34 extend through each of the wings 32 and the frame 2 of the apparatus for supporting the shell 27. A set of burners 35, mounted on a pipe 37, are located at the lower end of the shell 27, which produce a flame that projects into the shell 27. The pipe 37 is bent circularly and the lower end of the interior of the shell 27 is formed to have an inwardly curved surface 38 that directs the flame from the burners toward the lower end of the mandrel.

The space or annular opening 31 forms an outlet for the exhaust of the gases of the burners. The outlet may be dampered, by means of a metal ring or damper 40 that may be adjustably supported on screws by a plurality of pinions. The pinions may be rotated by a suitable hand wheel 41, through a sprocket chain connection to the pinions, to raise and lower the ring 40 to vary the effective area of the annular opening 31 and, thus, regulate the height that the flame from the burners 35 will extend upward and over the lower end of the glass-shaping element 18. If the opening is not closed by the ring 40, the flame will project to, and its products will exhaust readily through, the opening; but, if the annular opening 31 is substantially closed, the flame will be snubbed downward and will not extend its effective heat zone to as high a point within the shell 27. The heat of the burners may, thus, be confined to the lower end or near the tip of the element to heat the glass at the lower end of the element. This varies the fluidity of the glass and enables regulated movement of the glass, by its own weight, from the element. This will, also, enable the control of the thickness of the tube that is formed by the element.

The element or mandrel 18 is supported by a pipe 42 that extends downward through the tank 1. The pipe 42 may be raised to locate the upper end of the mandrel against the bottom 11 of the tank 1 and, substantially, close the opening 12. The lower end of the pipe 42 is provided with a refractory block 44 (Fig. 8), which is located in the upper end of the mandrel, for connecting the upper end of the mandrel 18 to the pipe 42. The block and mandrel are provided with shoulders 47 and 48, and keys 45 are located intermediate the shoulders and between the outer surface of the block 44 and the inner surface of the mandrel 18 and, thus, the mandrel may be raised and lowered by raising and lowering the pipe 42.

The pipe 42 extends through a U-bar 49, supported in the upper end of the frame 2, and is located in axial alignment with a nozzle 50 and in proximity thereto, so that air under pressure, directed through the pipe 51, will be projected by the nozzle 50 into the upper end of the pipe 42. This will give, merely, a slightly greater pressure than atmospheric within the pipe 42 and, as the glass tube is formed by the descent of the glass from the mandrel 18, the pressure will be sufficient to maintain the tubular form of the glass as it is produced by the mandrel and carried down to the rollers 21 of the bed 20.

The upper end 52 of the pipe 42 is threaded and means is provided for minutely lowering the mandrel 18 and, particularly, the upper end of the mandrel, from the lower end of the opening 12, progressively, as the level of the glass in the day tank lowers, to provide, automatically, a regulated and constant feed, notwithstanding the lowering of the level of the glass in the tank. The upper, threaded end of the pipe 42 is provided with a threaded sprocket gear wheel 54, which may be connected, by means of a sprocket chain 55, to a sprocket wheel 57 that is connected to a rod 58. The wheel 54 engages the cross bar 49 in the upper end of the frame 2 to support the pipe 42. The rod 58 extends through a gear wheel 60 (Figs. 3 and 4), which is driven by a motor 61. The speed of the motor is greatly reduced, by means of the gear boxes 62 and 64 and the connecting gears 60, 57, and 54.

Intermediate the reduction gear box 64 and the gear 60 is a means for manually varying the location of the mandrel 18 with respect to the lower end of the opening 12 in case the feed is not sufficiently fast to correspond to the pressure and viscosity of the glass as it leaves the furnace; that is, if the viscosity of the glass rises or is relatively high, the mandrel may be lowered by means of a handle 65 located on the end of the rod 58 that extends upwardly to the gears 57 and 60 to produce, if desired, a forward rotation of the gear in the direction that it is propelled by the motor 61 (Figs. 1 and 2). The gear wheel 60 is connected, by a sprocket chain 71, to the reduction gear of the gear box 64. The gear wheel 57 is mounted on the rod 58 and is pinned thereto. A ratchet 68 is, also, pinned to the rod 58 and has a sliding, frictional contact with the gear wheel 60 that is located thereon. The gear wheel 57 is positively connected to the gear wheel 60 by the dog 70, which is mounted on the gear wheel 60, and, when the gear wheel 57 is driven by the motor, the drive is through the ratchet 68 and the dog 70 (Figs. 3 and 7). When the rod 58 is rotated by the handle 65, in the direction in which the motor propels the gear wheel 57, and the rate of movement of the gear wheel 57 is accelerated by movement of the handle, the ratchet 68 is, also, moved in an advancing relation to the gear wheel 60 and the dog 70, and the gear wheel 54 is rotated to lower the mandrel an increased amount.

The pipe 42 is, preferably, covered with a sleeve 72 of refractory material, where it extends through the molten glass and the opening 12. In order to center the sleeve 72 and the pipe 42, with reference to the opening 12, a plurality of adjustable pipes 74 extend from the outside of the furnace to the pipe 42. The pipes 74 are, preferably, located in the top of the furnace in order to, accurately, adjust the mandrel 18 with reference to the opening 12. The burners, however, produce a whirling flame within the furnace, and thus, produce a uniform heat throughout the top of the furnace and above the surface of the glass. Preferably, smaller pipes 75 are located within the pipes 74, and short arcuate boxes 77 are located at the inner ends of the pipes 74 in engaging relation with the pipe 42. Water is directed, through supply pipes 78, into the pipes 75, through the boxes 77, and through the outer pipes 74 to the pipes 80 that are connected to a point of discharge. The arcuate boxes 77 fit the pipe 42 and rest upon the upper end of the sleeve 72.

The pipes 74 and 75 extend through the wall of the furnace. The outer ends of the pipes 74 and 75 are exteriorly threaded and connected to flexible tubes 81, which are, in turn, connected to the supply and return pipes 78 and 80. To adjust the centering pipes 74 and, thus, adjust the mandrel 18, relative to the opening 12, nuts 82 are located on the threaded ends of the pipes 74 and intermediate flange parts of the brackets 84 to cause the mandrel to be shifted, upon adjustment of the nuts 82. The constant flow of the cooling liquid prevents the burning or warping of the centering pipes by the interior heat of the furnace and, yet, maintains the upper end of the mandrel properly centered or adjusted, with respect to the opening 12.

The opening being located in the bottom of the tank, the glass flows downwardly from beneath the central part of its surface where the residue of the glass batch and the seeded glass collects and, consequently, only the finer glass is drawn through the opening and directed to the mandrel where it is formed into ware. The glass in contact with the wall of the tank adheres thereto and covers its surface to enclose any liquefied fluxing elements formed therein, and, hence, eliminates erosion of the elements from the wall and prevents its inclusion in the glass drawn from the tank.

During the melting of the glass batch materials, in advance of the formation of the ware, a water pipe 85 is connected to a removable connector pipe 87, which is, in turn, connected to a small cylinder 88 (Fig. 8). Also, a pipe 90 is connected, through the mandrel 18 and the refractory block 44, with the cylinder 88. The cylinder 88 is located in the pipe 42 and within the opening 12. The pipe 90 is connected to the supply pipe 78, and the water is caused to flow from the pipe 78 through the pipe 90 and the cylinder 88 to the pipe 87 and discharged through the pipe 85 that is connected to the water discharge pipe 86. As the batch melts to form the glass, the glass enters the opening 12 and is chilled by the water in the cylinder 88. The glass in the opening 12, thus, freezes and prevents the escape of glass as it is being melted. When it is desired to produce the ware and cause the glass to flow over the mandrel 18, the pipe 87, the cylinder 88, and the pipe 90 are removed from the pipe 42 and the mandrel 18, and when the frozen glass in the opening 12 is melted by the heat of the furnace, and the pipe 31 is inserted into position to locate the nozzle 50 in line with the pipe 42, the mandrel 18 is moved from the bottom 11 of the tank and the glass flows down over the mandrel to form the ware.

I claim:

1. Apparatus for producing a molten glass stream and for forming it into finished ware comprising a day tank having bottom, top and side walls, said top wall having a charging opening therein for permitting the introduction of raw glass batch materials into the tank, said bottom wall having a substantially centrally located discharge opening therein for discharging molten glass from the tank, a closure for said charging opening, a glass shaping element, means supported above the top wall and extending downwardly through the tank for supporting the glass shaping element below said discharge opening and in position to receive glass discharged therethrough, and adjusting means extending through a side wall of the tank and substantially horizontally through the tank and cooperating with the supporting means for the glass shaping element for adjusting the said element laterally with respect to said discharge opening.

2. Apparatus for producing a molten glass stream and for forming it into finished ware comprising a day tank having bottom, top and side walls, said top wall having a charging opening therein for permitting the introduction of raw glass batch materials into the tank, said bottom wall having a substantially centrally located discharge opening therein for discharging molten glass from the tank, a closure for said charging opening, a glass shaping element, means supported above the top wall and extending downwardly through the tank for supporting the glass shaping element below said discharge opening and in position to receive glass discharged therethrough, said shaping element having an upper end larger than said discharge opening, and means cooperating with the supporting means and positioned above the tank for adjusting the shaping element vertically with respect to said discharge opening to regulate the flow of glass therethrough.

3. Apparatus for producing a molten glass stream and for forming it into finished ware comprising a day tank having bottom, top and side walls, said top wall having a charging opening therein for permitting the introduction of raw glass batch materials into the tank, said bottom wall having a substantially centrally located discharge opening therein for discharging molten glass from the tank, a closure for said charging opening, a glass shaping element, means supported above the top wall and extending downwardly through the tank for supporting the glass shaping element below said discharge opening and in position to receive glass discharged therethrough, means cooperating with the supporting means and positioned above the tank for adjusting the shaping element vertically with respect to said discharge opening, and adjusting means extending through a side wall of the tank and cooperating with the supporting means for the glass shaping element for adjusting the said element laterally with respect to said discharge opening.

4. Apparatus for forming glassware comprising a day tank adapted to contain a mass of molten glass, said tank having top, side and bottom walls, said bottom wall having a discharge opening therein for discharging molten glass from the tank, a glass shaping element, supporting means extending downwardly through said tank and said discharge opening for supporting the glass shaping element below said opening, and means engaging said supporting means within the tank for adjusting it and the shaping element laterally of the opening.

5. Apparatus for forming glassware comprising a day tank having top, side and bottom walls, the bottom wall having a discharge opening therein through which molten glass is discharged from the tank, a glass shaping element, a blow pipe supported above the tank and extending downwardly through the tank and through said discharge opening, means for supporting the glass shaping element on said blow pipe below said discharge opening, a sleeve surrounding a portion of the blow pipe and extending through said discharge opening, and a plurality of adjusting members extending radially of the tank between the top and bottom walls thereof for adjusting said blow pipe and sleeve laterally of the opening.

EDWARD DANNER.